(12) United States Patent
Han et al.

(10) Patent No.: US 12,332,823 B2
(45) Date of Patent: *Jun. 17, 2025

(54) PARALLEL DATAFLOW ROUTING SCHEME SYSTEMS AND METHODS

(71) Applicant: T-Head (Shanghai) Semiconductor Co., Ltd., Shanghai Free Trade Area (CN)

(72) Inventors: Liang Han, Campbell, CA (US); ChengYuan Wu, Fremont, CA (US); Guoyu Zhu, San Jose, CA (US); Yang Jiao, San Jose, CA (US); Rong Zhong, Fremont, CA (US); Yunxiao Zou, Shanghai (CN)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,824

(22) Filed: May 25, 2022

(65) Prior Publication Data

US 2023/0244626 A1 Aug. 3, 2023

(51) Int. Cl.
*G06F 13/40* (2006.01)
*G06F 15/173* (2006.01)

(52) U.S. Cl.
CPC .... *G06F 13/4068* (2013.01); *G06F 15/17312* (2013.01)

(58) Field of Classification Search
CPC .......... G06F 13/4068; G06F 15/17312; G06F 15/163; G06F 15/16; G06F 15/173; G06F 15/17318; G06F 15/17356
See application file for complete search history.

(56) References Cited

U.S. PATENT DOCUMENTS

| 4,204,251 | A  | 5/1980  | Brudevold      |
| 4,816,993 | A  | 3/1989  | Takahashi      |
| 5,504,918 | A  | 4/1996  | Collette       |
| 5,734,872 | A  | 3/1998  | Kelly          |
| 7,149,876 | B2 | 12/2006 | Kirsch         |
| 7,483,428 | B2 | 1/2009  | Goodman        |
| 7,840,914 | B1 | 11/2010 | Agarwal et al. |
| 8,131,975 | B1 | 3/2012  | Cismas         |

(Continued)

*Primary Examiner* — Farley Abad
*Assistant Examiner* — Richard B Franklin

(57) ABSTRACT

The presented systems enable efficient and effective network communications. In one embodiment, a system comprises a parallel processing unit (PPU) included in a chip and a plurality of interconnects in an inter-chip network (ICN) configured to communicatively couple a plurality of PPUs that communicate with one another via the ICN. Corresponding communications are configured in accordance with routing tables. The routing tables can be stored and reside in registers of an ICN subsystem included in the PPU and include indications of minimum links available to forward a communication from the PPU and another PPU. Respective ones of the routing tables include indications of a correlation between the minimum links and respective ones of a plurality of egress ports that are available for communication coupling to the respective ones of PPUs that are possible destination PPUs. The routing tables can include indications of a single path between two PPUs per respective information communication flow.

22 Claims, 11 Drawing Sheets

(56) References Cited

U.S. PATENT DOCUMENTS

| | | |
|---|---|---|
| 8,145,880 B1 | 3/2012 | Cismas |
| 8,291,400 B1 | 10/2012 | Lee |
| 8,327,114 B1 | 12/2012 | Cismas |
| 8,375,395 B2 | 2/2013 | Prasanna |
| 8,510,535 B2 | 8/2013 | Deng |
| 8,583,896 B2 | 11/2013 | Cadambi |
| 8,990,460 B2 | 3/2015 | Chang |
| 10,580,190 B2 | 3/2020 | S. |
| 10,635,631 B2 | 4/2020 | Hutton et al. |
| 10,915,328 B2 | 2/2021 | Pearce et al. |
| 11,093,277 B2 | 8/2021 | Sankaran et al. |
| 11,211,334 B2 | 12/2021 | Lin et al. |
| 11,354,135 B2 | 6/2022 | Qin et al. |
| 11,487,541 B2 | 11/2022 | Corbal et al. |
| 11,693,691 B2 | 7/2023 | Sankaran et al. |
| 11,824,754 B2 * | 11/2023 | Magnezi ............ H04L 12/4633 |
| 11,960,437 B2 | 4/2024 | Han et al. |
| 2002/0199017 A1 | 12/2002 | Russell |
| 2008/0285562 A1 | 11/2008 | Scott et al. |
| 2010/0325257 A1 * | 12/2010 | Goel ..................... H04L 61/103 |
| | | 709/244 |
| 2012/0331268 A1 | 12/2012 | Konig |
| 2015/0006776 A1 | 1/2015 | Liu |
| 2017/0286169 A1 | 10/2017 | Ravindran et al. |
| 2019/0122415 A1 | 4/2019 | S. |
| 2019/0138890 A1 | 5/2019 | Liang et al. |
| 2019/0258796 A1 | 8/2019 | Paczkowski et al. |
| 2019/0294575 A1 | 9/2019 | Dennison et al. |
| 2020/0192676 A1 | 6/2020 | Pearce et al. |
| 2020/0249957 A1 | 8/2020 | Qin et al. |
| 2020/0401440 A1 | 12/2020 | Sankaran et al. |
| 2021/0081198 A1 | 3/2021 | Corbal et al. |
| 2022/0164218 A1 | 5/2022 | Sankaran et al. |
| 2023/0083705 A1 | 3/2023 | Corbal et al. |
| 2023/0089800 A1 * | 3/2023 | Chadalavada ...... G06F 11/2236 |
| | | 714/724 |
| 2023/0090604 A1 * | 3/2023 | Han ..................... G06F 15/173 |
| | | 718/106 |

* cited by examiner

900

910
Performing a setup operation including creation of static pre-determined routing tables.

920
Forwarding a communication packet from a source parallel processing unit (PPU), wherein the communication packet is formed and forwarded in accordance with the static pre-determined routing tables.

930
Receiving the communication packet at a destination parallel processing unit (PPU).

Fig. 9 ated herein
PARALLEL DATAFLOW ROUTING SCHEME SYSTEMS AND METHODS

RELATED APPLICATIONS

The present application claims priority to China Patent Application No. 202210108208.X filed Jan. 28, 2022 and titled "PARALLEL DATAFLOW ROUTING SCHEME SYSTEMS AND METHODS", which is incorporated herein by reference in its entirety.

FIELD OF THE INVENTION

The present invention relates to the field of information processing and communication in interconnected chip networks.

BACKGROUND OF THE INVENTION

Numerous electronic technologies such as digital computers, calculators, audio devices, video equipment, and telephone systems facilitate increased productivity and cost reduction in analyzing and communicating data and information in most areas of business, science, education, and entertainment. Electronic components can be used in a number of important applications (e.g., medical procedures, vehicle aided operation, financial applications, etc.) and frequently these activities involve processing and storing large amounts of information. To handle the large amount of processing, systems can include many processing chips interconnected with one another. In many applications it is important for systems to process information rapidly and accurately. The ability to rapidly and accurately process information is often dependent on communications between the processing chips. Establishing rapid and reliable information communication in interconnected chip networks can be problematic and difficult.

FIG. 1 is a block diagram illustrating an example of a conventional system 100 that can be used for accelerating neural networks. In general, the system 100 includes a number of servers, and each server includes a number of parallel computing units. In the example of FIG. 1, the system 100 includes servers 101 and 102. The server 101 includes parallel processing units (PPUs) PPU_0, . . . , PPU_n that are connected to a Peripheral Component Interconnect Express (PCIe) bus 111, and the server 102 includes a like array of PPUs connected to the PCIe bus 112. Each of the PPUs includes elements such as a processing core and memory (not shown). In one embodiment, a PPU can be a neural network processing unit (NPU). In one exemplary implementation, a plurality of NPUs are arranged in a parallel configuration. Each server in the system 100 includes a host central processing unit (CPU), and is connected to a network 130 via a respective network interface controller or card (NIC) as shown in the figure.

The system 100 incorporates unified memory addressing space using, for example, the partitioned global address space (PGAS) programming model. Thus, in the example of FIG. 1, each PPU on the server 101 can read data from, or write data to, memory on any other PPU on the server 101 or 102, and vice versa. For example, to write data from PPU_0 to PPU_n on the server 101, the data is sent from PPU_0 over the PCIe bus 111 to PPU_n; and to write data from PPU_0 on the server 101 to memory on PPU_m on the server 102, the data is sent from PPU_0 over the PCIe bus 111 to the NIC 121, then over the network 130 to the NIC 122, then over the PCIe bus 112 to PPU_m.

The system 100 can be used for applications such as graph analytics and graph neural networks, and more specifically for applications such as online shopping engines, social networking, recommendation engines, mapping engines, failure analysis, network management, and search engines. Such applications execute a tremendous number of memory access requests (e.g., read and write requests), and as a consequence also transfer (e.g., read and write) a tremendous amount of data for processing. While conventional communication (e.g., PCIe, etc.) bandwidth and data transfer rates are considerable, they are nevertheless limiting for such applications. As a practical matter PCIe is typically simply too slow and its bandwidth is too narrow for such applications.

SUMMARY

The presented systems enable efficient and effective network communications. In one embodiment, a system comprises: a plurality of PPUs included in a first chip and a plurality of interconnects in an ICN. The plurality of PPUs are included in a first chip and each of the PPUs includes a plurality of processing cores and a plurality of memories, wherein a first set of the memories couple to a first set of the plurality of processing cores. The plurality of interconnects in the ICN are configured to communicatively couple the plurality of PPUs. Each of the PPUs are configured to communicate over the ICN in accordance with respective routing tables that are stored and reside in registers included in the respective PPUs. The respective routing tables include indications of minimum links available to forward a communication from the PPU to another PPU. The PPUs can include respective plurality of egress ports configured to communicatively couple to the ICN, wherein the respective routing tables include indications of a correlation between the minimum links and the respective plurality of egress ports.

In one embodiment, a system comprises a first parallel processing unit (PPU) included in a chip and a plurality of interconnects in an inter-chip network (ICN) configured to communicatively couple a plurality of PPUs that communicate with one another via the ICN. Corresponding communications are configured in accordance with routing tables. The routing tables can be stored and reside in registers of an ICN subsystem included in the first PPU and include indications of minimum links available to forward a communication from the first PPU and another PPU. Respective ones of the routing tables include indications of a correlation between the minimum links and respective ones of a plurality of egress ports that are available for communication coupling to the respective ones of PPUs that are possible destination PPUs. The routing tables can include indications of a single path between two PPUs per respective information communication flow. In one embodiment, the first PPU is included in a first set of the plurality of PPUs and the first set of the plurality of PPUs is included in a first compute node, and a second set of the plurality of PPUs is included in a second node of the plurality of PPUs. Respective ones of the plurality of parallel processing units can include respective ones of the routing tables.

The interconnects can be configured for single-flow balancing, wherein the source PPU supports parallel communication flows up to a narrowest number of links between a source PPU and a destination PPU. The interconnects can be configured for many-flow balancing, wherein a relay PPU runs routing to balance flows among egresses. Communications can be processed in accordance with a routing scheme that provides balanced workloads, guaranteed dependency, and guaranteed access orders.

In one embodiment a communication method comprises performing a setup operation including creation of static pre-determined routing tables, forwarding a communication packet from a source parallel processing unit (PPU), and receiving the communication packet at a destination parallel processing unit (PPU). The communication packet can be formed and forwarded in accordance with the static pre-determined routing tables. The source PPU and destination PPU can be included in respective ones of a plurality of processing units included in a network. In one exemplary implementation, a first set of the plurality processing cores are included in a first chip and a second set of the plurality processing cores are included in a second chip. The plurality of PPUs can communicate over a plurality of interconnects. Corresponding communications can be configured in accordance with the static pre-determined routing tables. A routing scheme at the source PPU can be determined by: creating a flow ID associated with a unique communication path through the interconnects, wherein the flow ID is established by hashing a selected number of bits in the physical address; utilizing a corresponding one of the routing tables to ascertain a minimum links path to a destination; and establishing a routing selection based upon the flow ID and the minimum links path. A routing scheme at the relay PPU can including selecting an egress port. Selection of the egress port can include: creating a flow ID associated with a unique communication path through the interconnects, wherein the flow ID is established by hashing a selected number of bits in the physical address; mapping a source PPU ID and the flow ID; determining the number of possible egress ports available based upon the mapping; utilizing a corresponding one of the routing tables to ascertain a minimum links path to a destination; and establishing a routing selection based upon the flow ID, the number of possible egress ports, and the minimum links path. The communication method can further comprise balancing the forwarding of the communication packet, including distributing the communication packet via physical address based interleaving. Balanced workloads can be provided by multi-flow through minimal links and interleaving with flow ID and source parallel processing unit (PPU) ID. Guaranteed dependency can be provided by utilization of physical address (PA) interleaving with flow ID and hashing at the source parallel processing unit (PPU). Guaranteed access orders can be provided by utilization of flow ID along routs and splittable remote-fence.

These and other objects and advantages of the various embodiments of the invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

FIG. 9 is a flow chart of an exemplary communication method in accordance with one embodiment.

DETAILED DESCRIPTION

Figure 1:
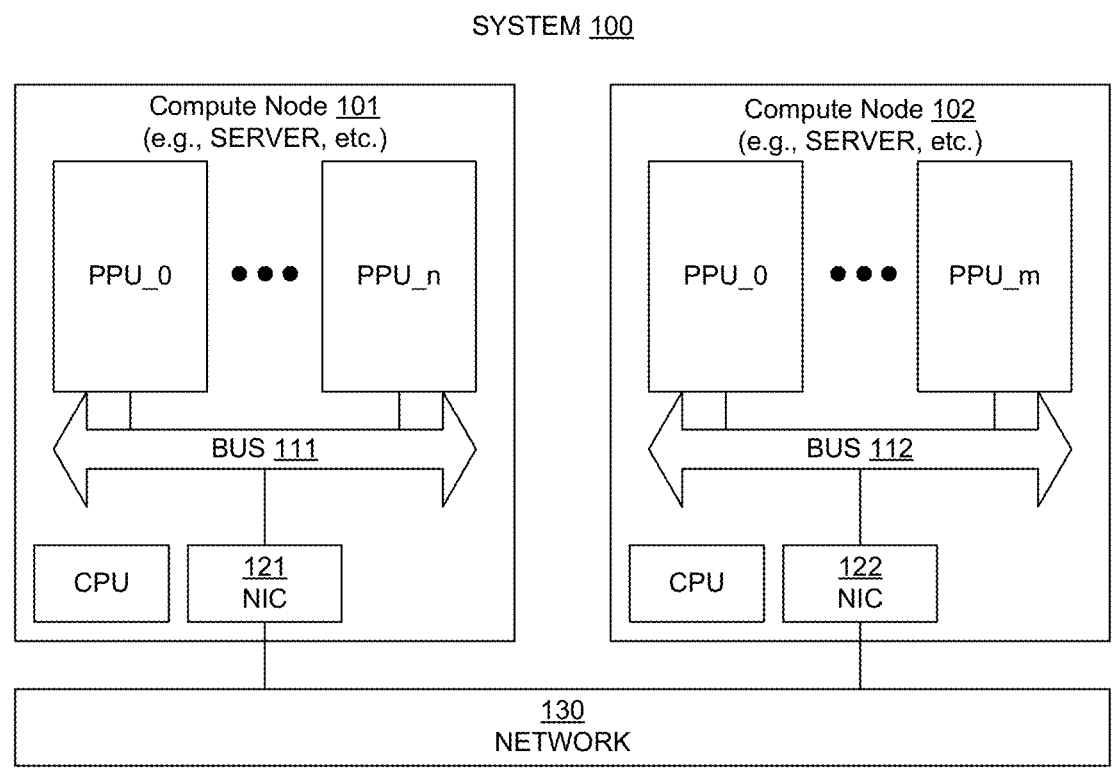
FIG. 1 illustrates an example of a conventional system.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "allocating," "storing," "receiving," "sending," "writing," "reading," "transmitting," "loading," "pushing," "pulling," "processing," "caching," "routing," "determining," "selecting," "requesting," "synchronizing," "copying," "mapping," "updating," "translating," "generating," "allocating," or the like, refer to actions and processes of an apparatus or computing system (e.g., the methods of FIGS. 7, 8, 9, and 10) or similar electronic computing device, system, or network (e.g., the system of FIG. 2A and its components and elements). A computing system or similar electronic computing device manipulates and transforms data represented as physical (electronic) quantities within memories, registers or other such information storage, transmission or display devices.

Some elements or embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media can include double data rate (DDR) memory, random access memory (RAM), static RAMs (SRAMs), or dynamic RAMs (DRAMs), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

The systems and methods are configured to efficiently and effectively enable implementation of parallel dataflow routing schemes. In one embodiment, the parallel dataflow routing schemes are implemented in interconnected chip networks (ICNs). In one embodiment, the systems and methods provide balanced workloads, guaranteed dependency, and guaranteed access orders (e.g., for consistency, etc.). Balanced workloads can be provided by multi-flow through minimal links and interleaving with flow ID and source parallel processing unit (PPU) ID. Guaranteed dependency can be provided by utilization of physical address (PA) interleaving with flow ID and hashing at the source parallel processing unit (PPU). Guaranteed access orders can be provided by utilization of flow ID along routs and splitable remote-fence. The systems and methods can also support workload balancing. It is appreciated there can be various routing schemes. A routing scheme can include a routing table. Routing schemes can be directed to routing at a source PPU, a relaying PPU, and so on. In one exemplary implementation, a simplified multi-path routing scheme can be used.

Figure 2A:
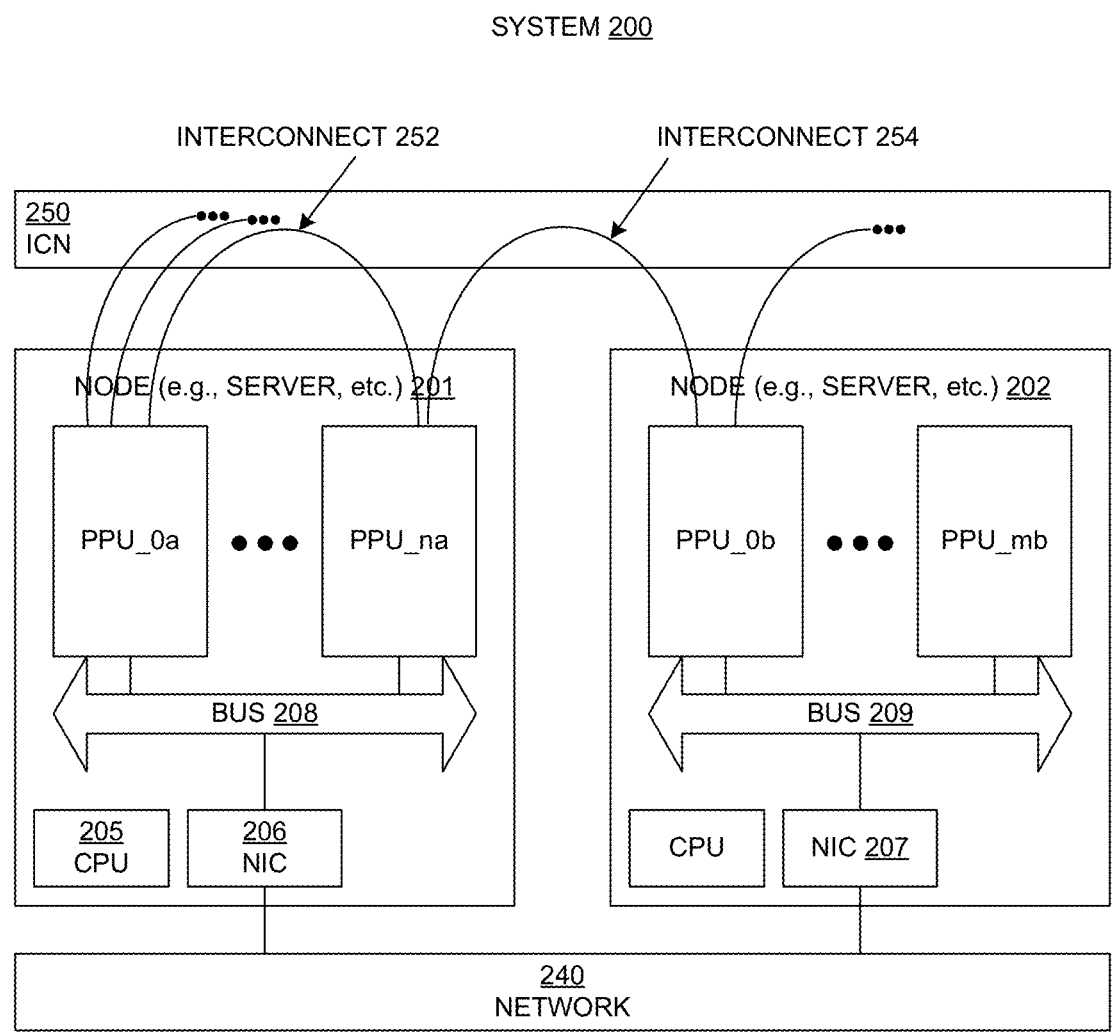
FIG. 2A is a block diagram illustrating an example of a system in accordance with one embodiment.

FIG. 2A is a block diagram illustrating an example of a system 200 in accordance with one embodiment. System 200 can be used for various types of workloads (e.g., general purpose processing, graphics processing, neural network data processing, etc.). In one embodiment, the system 200 can be used for neural network and artificial intelligence (AI) workloads. In general, the system 200 can be used for any parallel computing, including massive data parallel processing.

In general, the system 200 includes a number of compute nodes (e.g., servers, etc.) and each compute node or server includes a number of parallel computing units or chips (e.g., PPUs). In the example of FIG. 2A, the system 200 includes compute node (e.g., servers, etc.) 201 and 202. While FIG. 2 includes two compute nodes, it is appreciated the number of compute nodes can vary.

In one embodiment of FIG. 2A, the compute node 201 includes a host central processing unit (CPU) 205, and is connected to a network 240 via a network interface controller or card (NIC) 206. The compute node 201 can include elements and components in addition to those about to be described. Parallel computing units of the compute node 201 include network processing units (PPUs) PPU_0a, . . . , PPU_na that are connected to a Peripheral Component Interconnect Express (PCIe) bus 208, which in turn is connected to the NIC 206.

In one embodiment, the compute node 202 includes elements similar to those of the compute node 201 (although 'm' may or may not be equal to 'n'). Other compute nodes in the system 200 may be similarly structured. In one exemplary implementation, the compute nodes 201 and 202 can have identical structures, at least to the extent described herein.

The PPUs on the compute node 201 can communicate with (are communicatively coupled to) each other over the bus 208. The PPUs on the compute node 201 can communicate with the PPUs on the compute node 202 over the network 240 via the buses 208 and 209 and the NICs 206 and 207.

The system 200 of FIG. 2A includes a high-bandwidth inter-chip network (ICN) 250, which allows communication between the PPUs in the system 200. That is, the PPUs in the system 200 are communicatively coupled to each other via the ICN 250. For example, the ICN 250 allows PPU_0a to communicate with other PPUs on the compute node 201 and also with PPUs on other compute nodes (e.g., the compute node 202). In the example of FIG. 2A, the ICN 250 includes interconnects (e.g., the interconnects 252 and 254) that directly connect two PPUs and permit two-way communication between the two connected NPUs. The interconnects may be half-duplex links on which only one NPU can transmit data at a time, or they may be full-duplex links on which data can be transmitted in both directions simultaneously. In an embodiment, the interconnects (e.g., the interconnects 252 and 254) are lines or cables based on or utilizing Serial/Deserializer (SerDes) functionality.

In one embodiment of the example of FIG. 2A, the interconnect 252 is a hard-wired or cable connection that directly connects PPU_0a to PPU_na on the compute node 201, and the interconnect 254 is a hard-wired or cable connection that directly connects PPU_na on the compute node 201 to NPU_0b on the compute node 202. That is, for example, one end of the interconnect 252 is connected to NPU_0a on the compute node 201 and the other end is connected to PPU_na. More specifically, one end of the interconnect 252 is plugged into a port on or coupled to the switch 234 (FIG. 2C) and the other end of the interconnect 252 is plugged into a port on or coupled to a switch of the PPU_na.

Figure 2B:
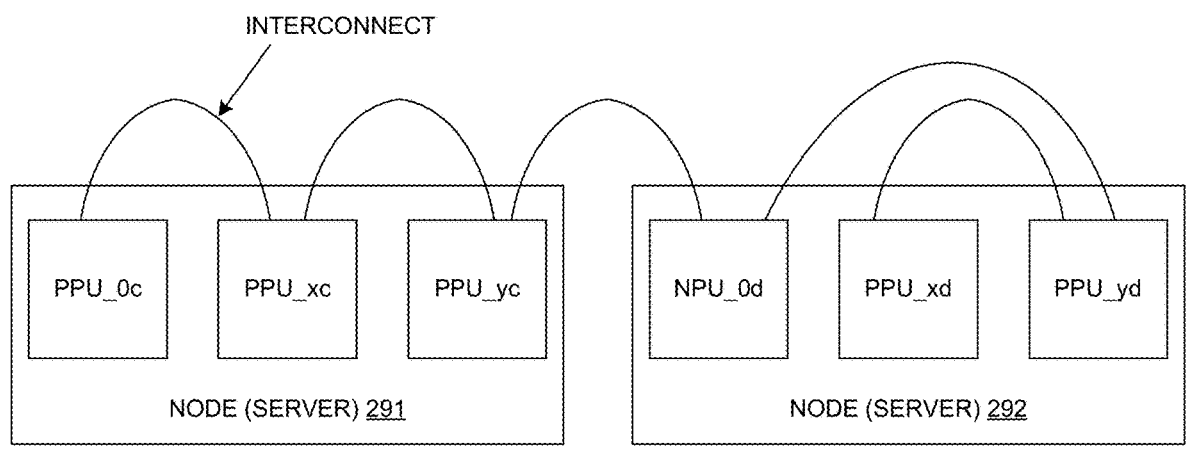
FIG. 2B is a block diagram illustrating an example of an ICN topology in one embodiment in which there are three PPUs per server are shown.

It is appreciated the actual connection topology (which NPU is connected to which other PPU) can vary. FIG. 2B is a block diagram illustrating an example of an ICN topology in one embodiment in which there are three PPUs per compute node are shown. It is appreciated the number of PPUs per compute node can vary. In one exemplary implementation, PPU_0c on the compute node 291 is connected to PPU_xc on the compute node 291, which in turn is connected to PPU_yc on the compute node 291. PPU_0c on the compute node 291 may be connected to an PPU on another compute node (not shown). PPU_yc on the compute node 291 is connected to PPU_0d on the compute node 292. In one embodiment, a PPU may be connected to its immediate neighbor on a compute node or its immediate neighbor on an adjacent compute node. It is appreciated the connections of PPUs can vary. Thus, in the example of FIG. 2B, PPU_0d on the compute node 292 is connected to PPU_yd on the compute node 292, which in turn is connected to PPU_xd on the compute node 292. PPU_xd on the compute node 292 may be connected to an PPU on yet another compute node (not shown). Interconnects that connect PPUs on the same compute node may be referred to as intra-chip interconnects, and interconnects that connect PPUs on different compute nodes may be referred to as inter-chip interconnects.

Communication between any two PPUs (e.g., where the two PPUs may be on the same compute node or on different compute nodes, etc.) can be direct or indirect. In one embodiment, direct communication is over a single link between the two PPUs, and indirect communication occurs when information from one PPU is relayed to another PPU via one or more intervening PPUs. For example, in the configuration exemplified in FIG. 2A, PPU_0a on the compute node 201 can communicate directly with PPU_na on the compute node 201 via the interconnect 252, and can communicate indirectly with PPU_0b on the compute node 202 via the interconnect 252 to PPU_na and the interconnect 254 from PPU_na to PPU_0b on the compute node 202. Communication between PPUs can include the transmission of memory access requests (e.g., read requests and write requests) and the transfer of data in response to such requests.

Communication between PPUs can be at the command level (e.g., a DMA copy) and at the instruction level (e.g., a direct load or store). The ICN 250 allows compute nodes and PPUs in the system 200 to communicate without using the PCIe bus 208, thereby avoiding its bandwidth limitations and relative lack of speed.

The PPUs may also be implemented using, or may be referred to as, neural PPUs. The PPUs may also be implemented as, or using, various different processing units including general purpose processing units, graphics processing units, neural network data processing and so on.

In one embodiment, the PPUs on the compute node 201 can also communicate with (are communicatively coupled to) each other over the bus 208, in addition to communicating via ICN 250. Similarly, the PPUs on the compute node 201 can also communicate with the PPUs on the compute node 202 over the network 240 via the buses 208 and 209 and the NICs 206 and 207.

The system 200 and PPUs (e.g., PPU_0a, etc.) can include elements or components in addition to those illustrated and described below, and the elements or components can be arranged as shown in the figure or in a different way. Some of the blocks in the example system 200 and PPUs may be described in terms of the function they perform. Where elements and components of the system are described and illustrated as separate blocks, the present disclosure is not so limited; that is, for example, a combination of blocks/functions can be integrated into a single block that performs multiple functions. The system 200 can be scaled up to include additional PPUs, and is compatible with different scaling schemes including hierarchical scaling schemes and flattened scaling schemes.

Figure 2C:
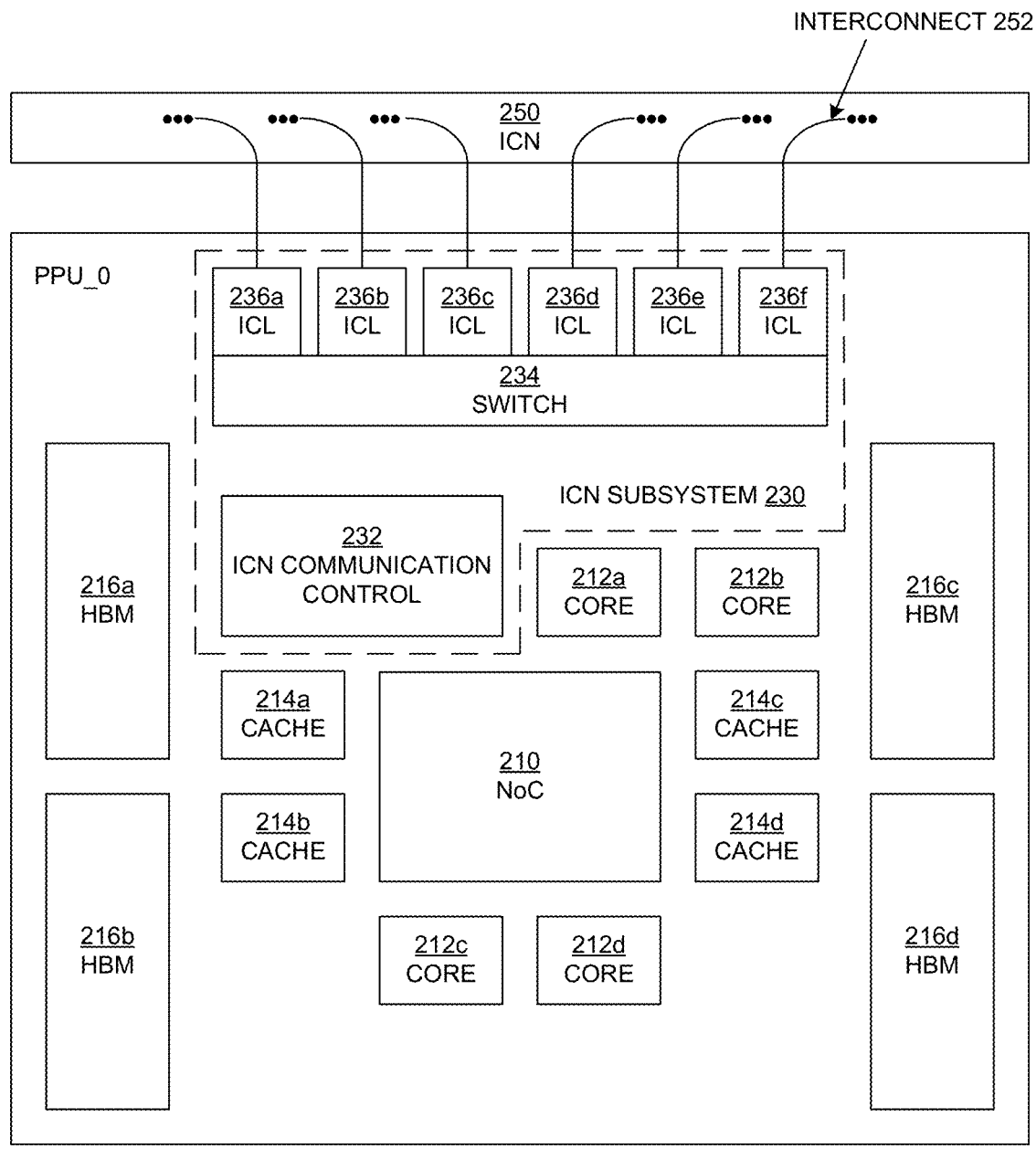
FIG. 2C is a block diagram illustrating an example of a parallel processing unit (PPU) in accordance with one embodiment.

In general, each of the PPUs on the compute node 201 includes elements such as a processing core and memory. FIG. 2C is a block diagram illustrating an example of a parallel processing unit PPU_0a in accordance with one embodiment. PPU_0a shown in FIG. 2C includes a network-on-a-chip (NoC) 210 coupled to one or more computing elements or processing cores (e.g., core 212a, 212b, 212c, 212d, etc.) and one or more caches (e.g., cache 214a, 214b, 214c, 214d, etc.). PPU_0a also includes one or more high bandwidth memories (HBMs), such as (e.g., HBM 216a, HBM 216b, HBM 216c, HBM 216d, etc.) coupled to the NoC 210. The processing cores, caches, and HBMs of FIG. 2C may also be collectively referred to herein as the cores 212, the caches 214, and the HBMs 216, respectively. In one exemplary implementation, the caches 214 are the last level of caches between the HBMs 216 and the NoC 210. The compute node 201 may include other levels of caches (e.g., L1, L2, etc.; not shown). Memory space in the HBMs 216 may be declared or allocated (e.g., at runtime) as buffers (e.g., ping-pong buffers, not shown in FIG. 2C).

PPU_0a may also include other functional blocks or components (not shown) such as a command processor, a direct memory access (DMA) block, and a PCIe block that facilitates communication to the PCIe bus 208. The PPU_0a can include elements and components other than those described herein or shown in FIG. 2C.

In one embodiment, the system 200 incorporates unified memory addressing space using, for example, the partitioned global address space (PGAS) programming model. Accordingly, memory space in the system 200 can be globally allocated so that the HBMs 216 on the PPU_0a, for example, are accessible by other PPUs on that compute node and by the PPUs on other compute nodes in the system 200. Similarly, PPU_0a can access the HBMs on other PPUs/compute nodes in the system. Thus, in the example of FIGS. 2A and 2B, one PPU can read data from, or write data to, another PPU in the system 200, where the two PPUs may be on the same compute node or on different compute nodes, and where the read or write can occur either directly or indirectly.

The compute node 201 is coupled to the ICN 250 by the ICN subsystem 230 (FIG. 2C), which is coupled to the NoC 210. In one embodiment, the ICN subsystem 230 includes an ICN communication control block (communication controller) 232, the switch 234, and one or more inter-communication links (ICLs) (e.g., the ICL 236; collectively, the ICLs 236). The ICLs 236 can be coupled to or a component of switch 234. The ICLs 236 can constitute or includes a port. In one exemplary implementation, there are seven ICLs. Each of the ICLs 236 is connected to a respective interconnect (e.g., the interconnect 252, etc.). One end of the interconnect 252 can be coupled or plugged into the ICL (port) 236 on the PPU_0a (and the other end of the interconnect can be coupled or plugged into another ICL/port on another PPU).

In one configuration of FIG. 2C, a memory access request (e.g., a read request or a write request) by PPU_0a, for example, is issued from the NoC 210 to the ICN communication control block 232. The memory access request includes an address that identifies which compute node/PPU/HBM is the destination of the memory access request. The ICN communication control block 232 uses the address to determine which of the ICLs 236 is communicatively coupled (directly or indirectly) to the compute node/PPU/HBM identified by the address. The memory access request is then routed to the selected ICL 236 by the switch 234, then through the ICN 250 to the compute node/PPU/HBM identified by the address. At the receiving end, the memory access request is received at an ICL of the destination PPU, provided to the ICN communication control block and the NoC of that PPU, and finally to the HBM on that PPU addressed by the memory access request. If the memory access request is a write request, then data is stored at the address in the HBM on the destination PPU. If the memory access request is a read request, then data at the address in the HBM on the destination PPU is returned to PPU_0a. In this manner, inter-chip communication is expeditiously accomplished using the high-bandwidth ICN 250, bypassing the PCIe bus 208 and thereby avoiding its bandwidth limitations and relative lack of speed.

A PPU can include a compute command ring coupled between the cores 212 and the ICN subsystem 230. The compute command rings may be implemented as a number of buffers. There may be a one-to-one correspondence between the cores and the compute command rings. Commands from processes executing on a core are pushed into the header of a respective compute command ring in the order in which they are issued or are to be executed.

The ICN subsystem 230 can also include a number of chip-to-chip (C2C) DMA units that are coupled to the command and instruction dispatch blocks. The DMA units are also coupled to the NoC 210 via a C2C fabric and a network interface unit (NIU), and are also coupled to the switch 234, which in turn is coupled to the ICLs 236 that are coupled to the ICN 250.

In one embodiment, there are 16 communication command rings and seven DMA units. There may be a one-to-one correspondence between the DMA units and the ICLs. The command dispatch block maps the communication command rings to the DMA units and hence to the ICLs 236. The command dispatch block 304, the instruction dispatch block, and the DMA units may each include a buffer such as a first-in first-out (FIFO) buffer (not shown).

The ICN communication control block 232 maps an outgoing memory access request to an ICL 236 that is selected based on the address in the request. The ICN communication control block 232 forwards the memory access request to the DMA unit 308 that corresponds to the selected ICL 236. From the DMA unit, the request is then routed by the switch 234 to the selected ICL.

The system 200 and PPUs are examples of a system and a processing unit for implementing methods such as those disclosed herein (e.g., method in FIG. 9, etc.).

Figure 3:
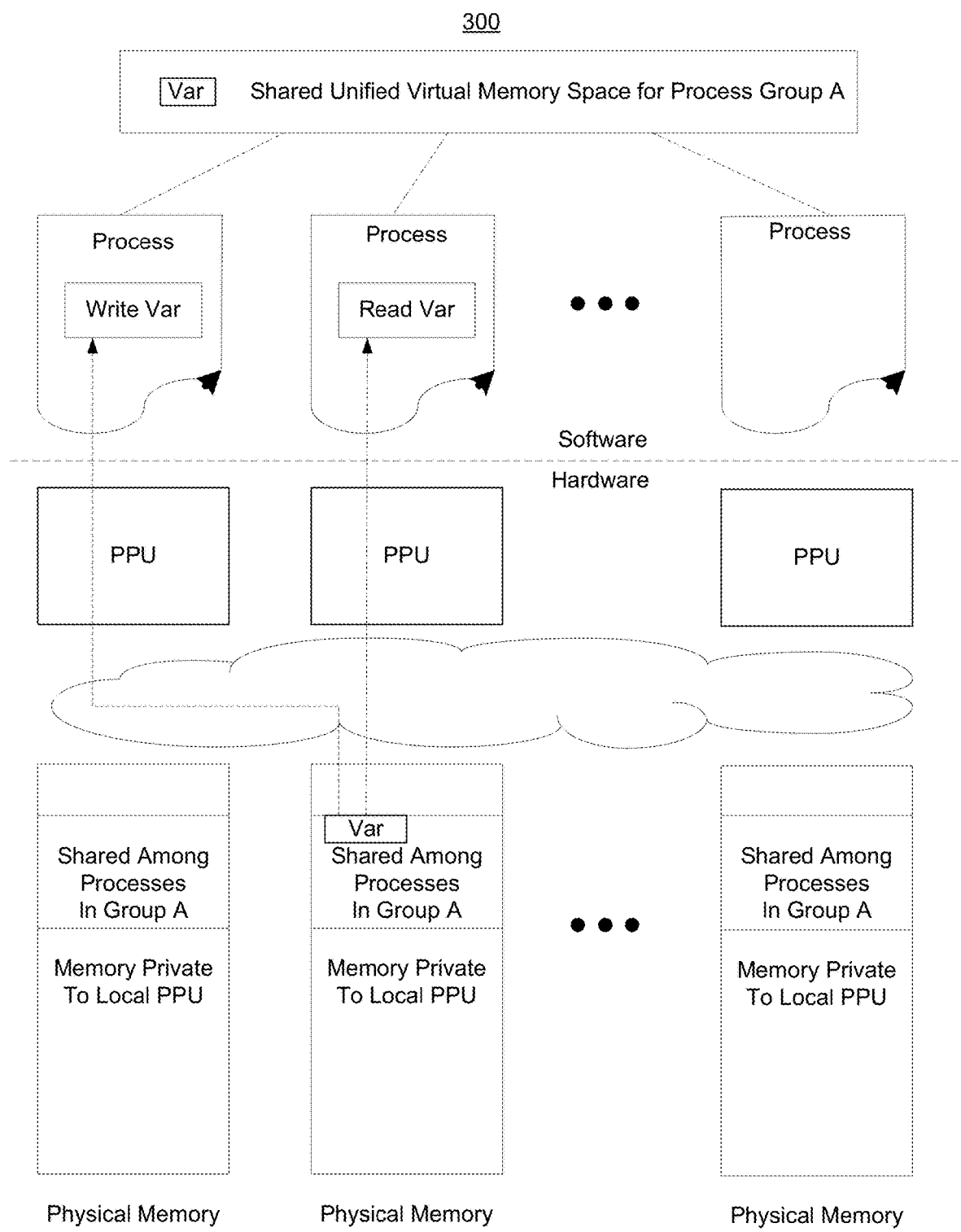
FIG. 3 is a block diagram of an exemplary unified memory addressing space in accordance with one embodiment.

FIG. 3 is a block diagram of an exemplary unified memory addressing space in accordance with one embodiment. The unified memory addressing space can enable implementation of a partitioned global address space (PGAS) style program model. The communication between programs can flow at different levels. In a command level the communication can include a direct memory access (DMA) copy operation. In an instruction level the communication can include a direct load/store operation. In one embodiment, a variable VAR considered part of the shared space can be stored locally in one physical memory. In one exemplary implementation, the value of VAR can be written to a first process on a first PPU and read by a second process on a second PPU.

Figure 4:
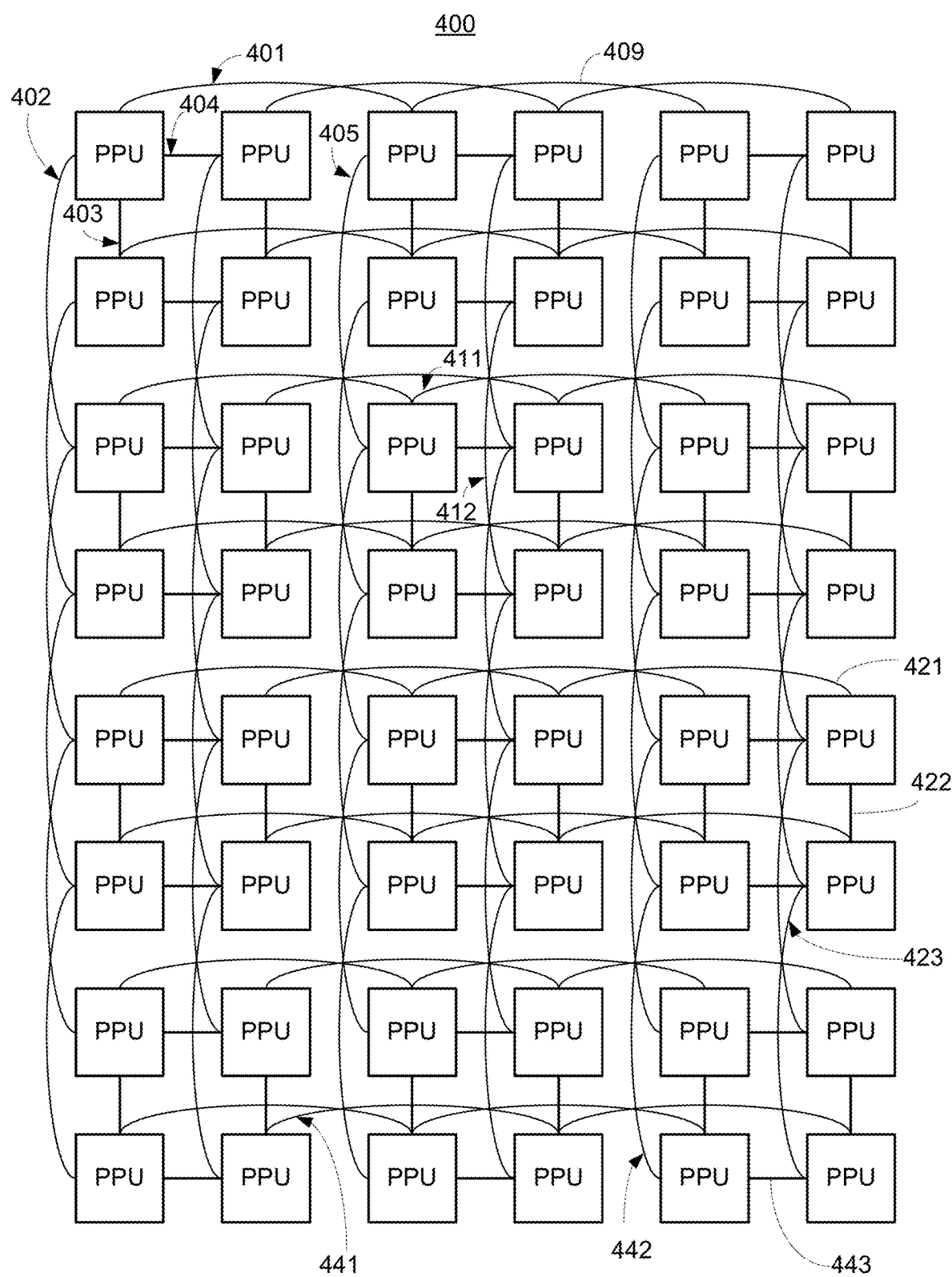
FIG. 4 is a block diagram of a scaling hierarchy in accordance with one embodiment.

FIG. 4 is a block diagram of an exemplary system 400 in accordance with one embodiment. System 400 is an example of a scaling hierarchy or topology approach in accordance with one embodiment. In one exemplary implementation, a plurality of PPUs are communicatively coupled to one another by ICN connections (e.g., 401, 402, 403, 404, 405, 409, 411, 412, 421, 422, 423, 441, 442, 443, etc.).

In one embodiment in which multiple chips which are communicatively networked together in some topology, a routing scheme enables the system to route communications to an appropriate destination chip for each request. In one exemplary implementation, a chip includes a communication processing component. The communication processing component can be considered a parallel processing unit (PPU). In one embodiment, a routing table and some routing rules instruct hardware how to control the data flow. In one exemplary implementation, a routing scheme can be implemented in a neural network configuration.

It is appreciated the communication networks can have various configurations. In general, information/data communications flow from a source to a destination. In one embodiment, a communication routing path can be identified by an indication of a source and destination associated with the communication. A network can include more destination components than egress ports included in a PPU, in which case each PPU cannot be directly coupled to every other PPU in the network. In one embodiment, a network includes intermediate PPUs other than the source PPU and destination PPU to assist in routing data between the source and destination. In one exemplary implementation, an intermediate PPU is considered a relay. A network can be configured with intermediate or relay components between a source and destination (e.g., in a "mesh" topology etc.). As a general proposition, a source is the origination/first communication PPU in a path, a relay is an intermediate PPU (e.g., that receives a communication from an upstream/previous PPU and forwards the communication to a downstream/next PPU in the path, etc.), and a destination is the final/last communication PPU in a path. A network can include multiple paths or routes between a source and destination.

Data can be communicated along or flow along a communication "path" in network formed via communication "links" between the communication components (e.g., PPUs, etc.). The data can be divided/separated into packets. The different packets can flow along the same links or different links. Additional description of communication paths and links is presented in other portions of this detailed description.

When communicating in a network there are typically some key considerations to resolve. One consideration is how to handle communications when multiple network paths exist from a source to a destination. Reaching an appropriate balance of resource utilization and workload distribution in a multiple path network can be difficult because always utilizing just a single link basically leaves the other available resources idle, but attempting to always fully utilize all the links can introduce impractical coordination complexity. Accuracy is typically very important in a number of applications and the timing of memory access operations is often essential to maintaining accuracy.

In complex communication networks, there can be various issues and conditions that potentially impact timing of memory access operations (e.g., read, write, etc.). In one exemplary implementation, there can be multiple write operations associated with conveying information (e.g., different writes can involve/convey different portions of the data, etc.) and different portions of the write operations can potentially be communicated via different network paths. One path can be faster at communicating information than another path. If appropriate write operation timing (e.g., including considerations for communication durations, etc.) is not guaranteed, a second (e.g., "later", subsequent, etc.) write request can overpass a first (e.g., previous, "earlier", etc.) write request through another faster communication path and the second write operation can occur earlier than the first write operation in a manner that violates appropriate operation timing. In general, the timing or write operations can be associated with memory/data consistency. An application can require a first piece of data and second piece of data to be written to the same address/location or different addresses/locations. In one embodiment, if the two different pieces of data are being written to the same address, the timing are considered related to data dependency and if the two different pieces of date are being written to different addresses the timing is considered related to access order.

Figure 5A:
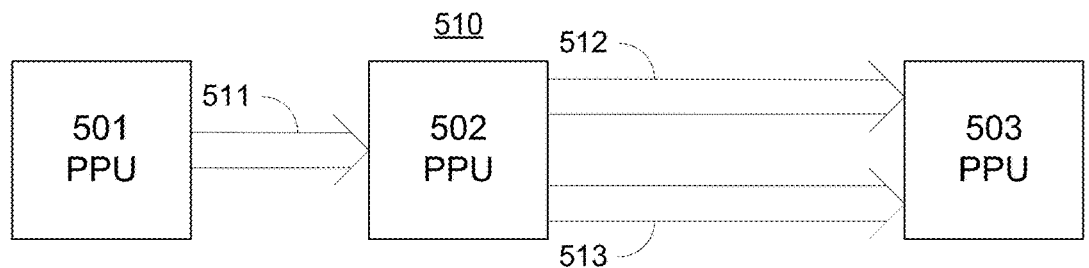
FIGS. 5A, B, C, and D are block diagrams of portions of a communication network in accordance with one embodiment.

FIG. 5A is a block diagram of an exemplary portion of a communication network in accordance with one embodiment. Communication network portion 510 includes a source PPU 501, relay PPU 502, and destination PPU 503. Source 501 is communicatively coupled to relay PPU 502 via communication link 511 and relay PPU 502 is communicatively coupled to destination PPU 503 via communication links 512 and 513. In one embodiment, the bandwidth is constrained by the narrowest path/links between the source and the destination. For example, although there are two links/paths 512 and 513 in the network segment between PPU 502 and PPU 503, there is only one link/path 511 in the network segment between PPU 501 and PPU 503. In one exemplary implementation, the throughput is determined by link 511 even though there is link 512 and link 513 (for a total of two paths wide between the second PPU 502 and third PPU 503, etc.). In one exemplary implementation, one link (e.g., link 511, etc.) is the limit on the overall through put and thus is the basis for the minimum link idea. From the view of a chip including PPU 510 routes reaching a destination chip including PPU 503 have a minimum link (Minlink #) of one.

Figure 5B:
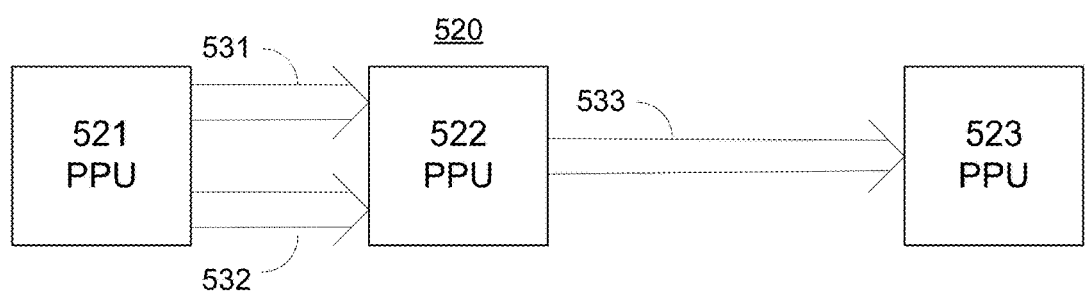

FIG. 5B, is a block diagram of an exemplary portion of a communication network in accordance with one embodiment. Communication network portion 520 includes a source PPU 521, relay PPU 522, and destination PPU 523. Source 521 is communicatively coupled to relay PPU 522 via communication links 531 and 532, and relay PPU 522 is communicatively coupled to destination PPU 523 via communication link 533. Communication network portion 520 has a different configuration than communication network portion 510, but still has a minimum link of 1. Similar to communication portion 510, in communication portion 520 the bandwidth is constrained by the narrowest path/links between the source and the destination. For example, although there are two links/paths 531 and 532 in the network segment between PPU 521 and PPU 522, there is only one link/path 533 in the network segment between PPU 522 and PPU 523. In one exemplary implementation, the throughput is determined by link 533 even though there is link 531 and link 532 (for a total of two paths wide between the second PPU 522 and third PPU 523, etc.). In one exemplary implementation, again one link (e.g., link 533, etc.) is the limit on the overall through put and thus is the basis for the minimum link idea. From the view of a chip including PPU 520 routes reaching a destination chip including PPU 523 have a minimum link (Minlink #) of one.

In a multiple flow system, a relaying chip can run in a manner that balances flow among egresses. From PPU 501 to PPU 503 the minimum link is one, and thus in the network segment between PPU 502 and 503 one of the links 512 or 513 is utilized to communicate information from PPU 501 to PPU 503. It is appreciated that if one of the links such as 512 is used for the communication from PPU 510 to PPU 503, the other link such as 513 can be used for other communications. In one exemplary implementation, another PPU (not shown) similar to PPU 501 is coupled to PPU 502 and a communication from the other PPU is forwarded from PPU 502 to PPU 3 vis link 513. When there are multiple links between two PPUs, it is often desirable to balance the data flow over the multiple links. In that case the systems and methods balance the PPU workload in the communication lanes/paths.

Figure 5C:
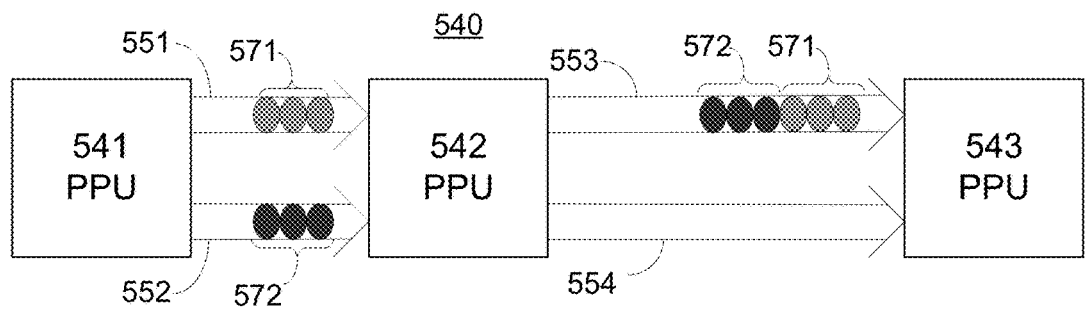

FIG. 5C is a block diagram of an exemplary portion of a communication network in accordance with one embodiment. Communication network portion 540 includes a source PPU 541, relay PPU 542, and destination PPU 543. Source 541 is communicatively coupled to relay PPU 542 via communication links 551 and 552 and relay PPU 542 is communicatively coupled to destination PPU 543 via communication links 553 and 554. Link 551 communicates data 571 and link 552 communicates data 572 from PPU 541 to PPU 542. Link 553 communicates data 571 and 572 from PPU 542 to PPU 543. In one exemplary implementation, the workload communication network portion 540 is not optimally balanced by the relay PPU 542. Communication network portion 540 has two links/paths 551 and 552 in the network segment between PPU 541, and PPU 542 and two links/paths 553 and 554 in the network segment between PPU 542 and PPU 543. Thus, the minimum link number (MinLink #) is 2. The source PPU 541 balances the data traffic by sending data 571 on link 551 and data 572 on link 552. Unfortunately, the data traffic from PPU 542 to PPU 543 on links 553 and 554 is not balanced (e.g., the relay PPU 542 sends the both the data 571 and 572 on link 553 leaving link 554 empty, etc.).

Figure 5D:
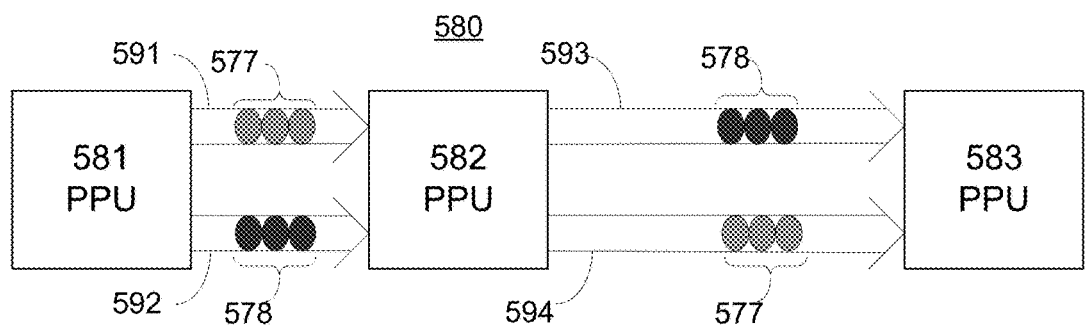

FIG. 5D is a block diagram of an exemplary portion of a communication network in accordance with one embodiment. Communication network portion 580 includes a source PPU 581, relay PPU 582, and destination PPU 583. Source 581 is communicatively coupled to relay PPU 582 via communication links 591 and 592, and relay PPU 582 is communicatively coupled to destination PPU 583 via communication links 593 and 594. Link 591 communicates data 577 and link 592 communicates data 578 from PPU 581 to PPU 582. Link 593 communicates data 578 and link 594 communicates data 577 from PPU 582 to PPU 583. In one exemplary implementation, the workload communication network portion 580 in FIG. 5D is more optimally balanced than communication network portion 540 in FIG. 5C. Communication network portion 580 has two links/paths 591 and 592 in the network segment between PPU 581, and PPU 582 and two links/paths 593 and 594 in the network segment between PPU 582 and PPU 583. Thus, the minimum link number (MinLink #) is 2. The source PPU 581 balances the data traffic by sending data 577 on link 591 and data 578 on link 592. The relay PPU 582 also balances the data traffic by sending data 578 on link 593 and data 577 on link 593.

In one embodiment, a basic routing scheme is simple and implemented in hardware. In one exemplary implementation, static predetermined routing is used and set before running. In one exemplary implementation, once a routing table is set it cannot be changed at runtime by hardware. The routing information can be programmed/reprogrammed into the hardware registers before run time. The hardware can reconfigure it next time when it is reset, but once it is set it cannot be changed at run time. In one embodiment, a system uses a basic XY routing scheme plus some simple rules to develop a routing table.

In one embodiment, a PPU includes a routing table. In one embodiment, a routing table can have the following configuration:

TABLE 1

| DestPPU_ID | MinLink | Egress 0 | Egress 1 | Egress 2 | Egress 3 | Egress 4 | Egress 5 | Egress 6 |
|---|---|---|---|---|---|---|---|---|
| ... | | | | | | | | |
| 4 | 2 | 1 | 1 | 0 | 0 | 0 | 0 | 0 |
| 5 | 3 | 0 | 0 | 1 | 1 | 1 | 0 | 0 |
| ... | | | | | | | | |

In one embodiment, each chip/PPU has 7 ports and a bit is set to indicate whether the port is available/should be used for routing a packet. In one embodiment, a bit is set to logical 1 to indicated the egress port is available and a logical 0 to indicate the egress port is not available. In one exemplary implementation, the system can support up to 1024 chips/PPUs and a routing table can have a corresponding number of entries from each source PPU. It means from a source PPU can reach up to 1023 destination chips/PPUs. Each entry corresponds to a communication from the associated source PPU to a specific destination PPU. For the example table above, the routing table indicates which of the 7 egress ports are available/should be used to communicate with PPU4 and PPU5. The routing table can include a field for a minimum link indication associated with to communications to an indicated destination PPU. Although there can be multiple paths with multiple hops, in one embodiment the minimum link number is narrowest path. To reach chip/PPU number 4 there is a minimum link of two. In that case, another hop in the overall route/path between the source and destination can have maybe 3 links, but this hop from the PPU the search table is associated with to PPU 4 is 2 links.

Figure 6:
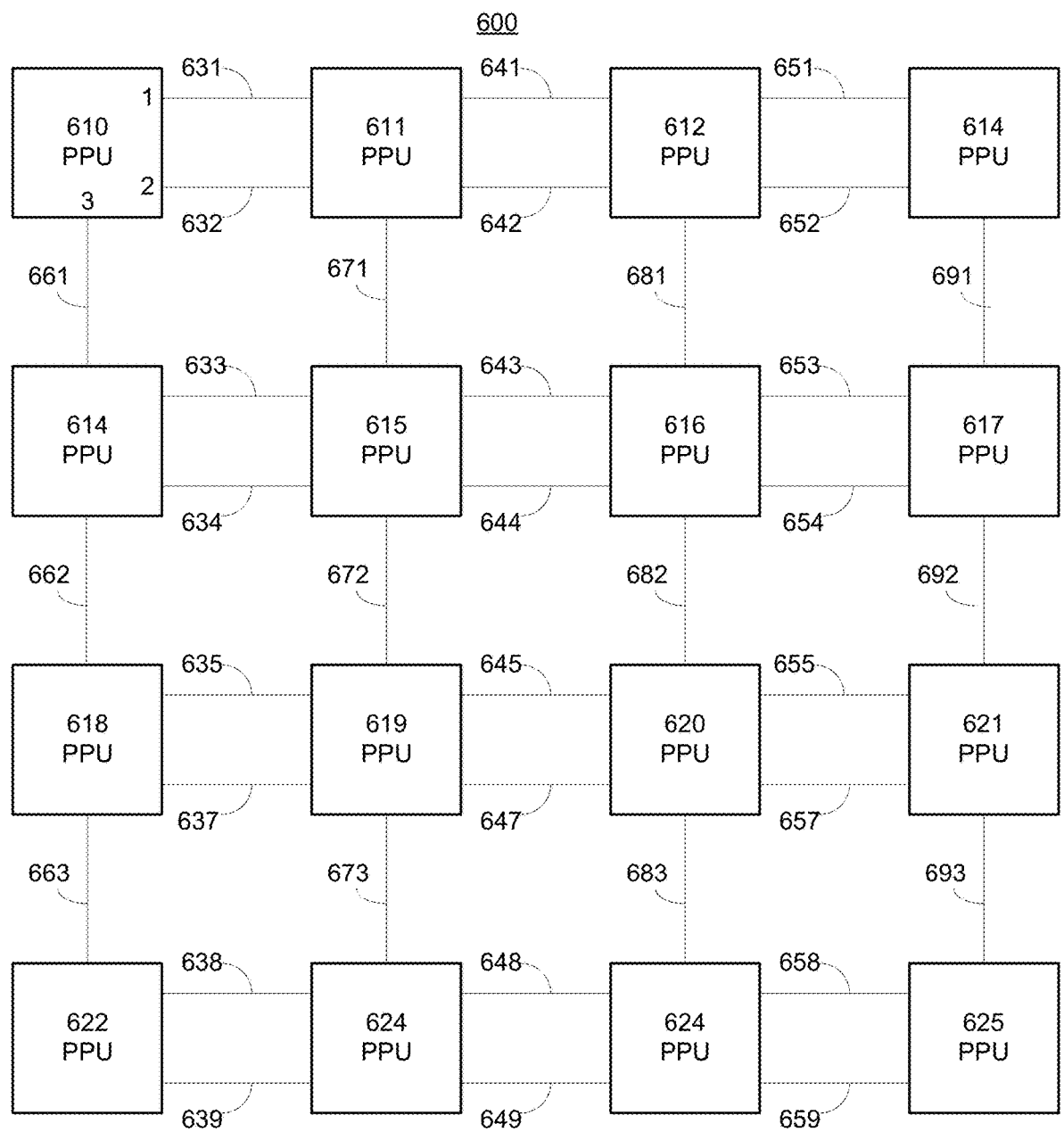
FIG. 6 is a lock diagram of an exemplary portion of a communication network in accordance with one embodiment.

FIG. 6 is a block diagram of an exemplary portion of a communication network 600 in accordance with one embodiment. Communication network 600 includes PPUs 610 through 625 that are communicatively coupled via links 631 through 693.

In one exemplary implementation, data is sent from PPU 610 to PPU 615. In this example, PPU 610 is acting as a source PPU and PPU 615 is acting as a destination PPU. PPU 611 and PPU 614 can act as relay PPUs. Links 631 and 632 can be used to forward data from PPU 610 to PPU 611, and link 671 can be used to forward data from PPU 611 to PPU 615. Link 661 can be used to forward data from PPU 610 to PPU 614, and links 633 and 634 can be used to forward data from PPU 614 to PPU 615. While links 631, 632, 633, 634, 661, and 671 can typically be used to communicate information between some of the PPUs, some of the links can be turned off or disabled. Additional explanation of turning off or disabling PPUs is presented in other portions of this detailed description.

In this scenario of with PPU 610 being the source and PPU 615 being the destination, when examining the first path via relay PPU 614 and the second path via relay PPU 611 it is determined that the minimum link number is one. For example, the first path via relay PPU 641 even through the path between PPU 614 and PPU 615 could have two links (e.g., 633 and 634), the path between PPU 610 and PPU 614 has only one link (e.g., 661). Thus, the minimum link number is one (e.g., corresponding to link 661, etc.). Similarly, the second path via relay 661 has a minimum link one (e.g., corresponding to link 671). In one embodiment, a driver uses the minimum link information and disables either link 613 or link 632.

In one exemplary implementation, the PPU 610 does not care which relaying PPU (e.g., 611, 614, etc.) is used, it just cares about indicating the destination PPU 615 is and which egress port the communication will be forwarded from. In one exemplary implementation, the information is sent to relay PPU 611 and the first hop in the path from source PPU 610 to destination PPU 615 is through egress port one or egress port two of PPU 610. If egress port one of PPU 610 is used then egress port two can be disabled/turned off, and vice versa. Since PPU 614 is not being used the ports 633 and 634 can remain enabled/left on to handle other communications (e.g., to serve communication from PPU 618 to PPU 615, etc.). In one exemplary implementation, while PPU 610 does not necessarily care which relaying PPU is used (e.g., 611, 614, etc.), an overall system may care and which relaying PPU is used can be important. Additional explanation of path/link/PPU selection considerations (e.g., impacts on workload balancing, data consistency, etc.) is presented in other portions of this detailed description.

In one exemplary implementation, data is sent from PPU 610 to PPU 620. In this example, PPU 610 is acting as a source PPU and PPU 620 is acting as a destination PPU. PPUs 611, 612, 614, 615, 616, 618, and 619 can act as relay PPUs. Even tough there are more potential paths from PPU 610 to PPU 620 than from PPU 610 to PPU 620, the routing decisions as far as PPU 610 are concerned are the same because in both scenarios PPU 610 is forwarding the information to either PPU 611 or PPU 614 and does not have any control over routing decisions further downstream on the path from PPU 610 to PPU 620. In one exemplary implementation, the only unique flow a PPU is concerned about is the next hop leaving the PPU and not other hops in the path or flow.

In one embodiment, a flow identification (ID) is utilized in a routing decision. The flow ID can correspond to a unique path between a source and a destination. As indicated above, the data flow from PPU 610 to destination 615 can be split into two data flows (e.g., via PPU 661 and PPU 614). In one exemplary implementation, a flow ID can be created by a hashing of selected from the physical address of a destination PPU. In addition, a flow ID function can include a minimum link indication. In one exemplary implementation, a flow identification determination operation can be expressed as:

Flow_id=gen_flow_id (hashing(selected_bits(&PA)), #MinLink).
Similarly, indication of an egress port selection can be expressed as:
ePort_id=mapping (Flow_id % #MinLink).
As indicated previously, for a source PPU and destination PPU pair (e.g., srcPUU-dstPPU, etc.) there can be multiple paths. In one embodiment, the source PPU only uses the minimum number of links (e.g., #MinLink, etc.). In each program flow (e.g., process, stream, etc.) of one exemplary implementation, data flowing from a local PPU (or source PPU) to a destination PPU is evenly distributed along the multiple paths. In one embodiment, the path split is based upon a physical address (PA). A hashing function can be applicated to better balance accesses with strides.

Figure 7:
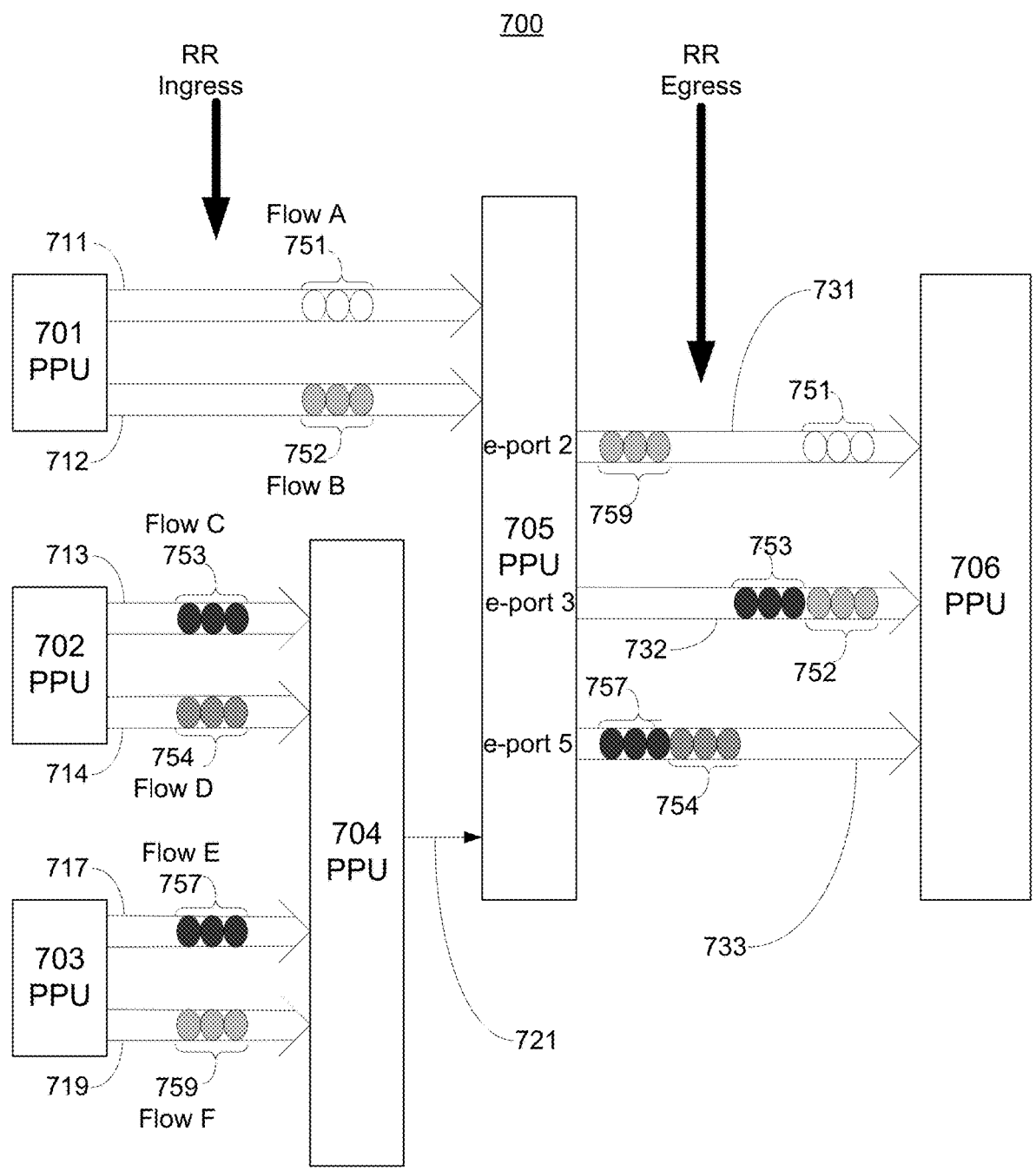
FIG. 7 is a block diagram of an exemplary portion of a communication network in accordance with one embodiment.

FIG. 7 is a block diagram of an exemplary portion of a communication network 700 in accordance with one embodiment. Communication network 700 includes PPU 701, 702, 703, 704, 705, and 706. PPU 701 is communicatively coupled to PPU 705 via links 711 and 712. PPU 702 is communicatively coupled to PPU 704 via links 713 and 714. PPU 703 is communicatively coupled to PPU 704 vis link 171 and 719. PPU 704 is communicative coupled to PPU 705 via path 771. PPU 705 is communicatively lined to PPU 706 via links 731, 732, and 733. Links 711, 712, 713, 714, 717, and 179 communicate data 751, 752, 753, 754, 757, and 759 respectively. Link 731 communicates data 759 and 751. Link 732 communicates data 753 and 752. Link 733 communicates data 757 and 754.

In one embodiment, relay PPU 705 receives RR ingress data from PPUs 701, 702, 703, and 704 and forwards the data to PPU 706. With respect to forwarding information to PPU 706, a PPU 705 looks up the entry for destination PPU 706 to determine which egress ports are available. In one embodiment, a routing table includes information on the topology of connections between chips or PPUs. Table 2 is a block diagram of an exemplary a portion of a routing table used by PPU 705 for communications to destination PPU 706.

exemplary implementation, a flow ID is unique locally. In one exemplary implementation, a globally unique ID is established by adding an indication of a source PPU to the flow ID. In one embodiment, a first source uses the first linkage and a third linkage, a second source uses a second linkage and the third linkage, and a third source uses the third linkage and the first linkage (e.g., see FIG. 7 links 731, 732, and 733 communicating information from first source 701, second source 702 and third source 703, etc.). In one exemplary implementation, the six traffic flows are overall balanced.

Table 3 is not a routing table, but rather just an exemplary illustration showing an association of data flows to egress ports after a relay routing algorithm selects the egress ports for particular flows of data.

TABLE 3

| DestPPU_ID | Egress 0 | Egress 1 | Egress 2 | Egress 3 | Egress 4 | Egress 5 | Egress 6 |
|---|---|---|---|---|---|---|---|
| 706 | 0 | 0 | 1 Flow-A Flow-F | 1 Flow-B Flow-C | 0 | 1 Flow-D Flow-E | 0 |

With reference again to FIG. 7, data 751 and 759 are forwarded via egress port 2 on link 731, with data 751 associated with flow ID "Flow-A" and data 759 associated with flow IDF. Data 552 and 753 are forwarded via egress port 3 on link 732, with data 752 associated with flow ID "Flow-B" and data 753 associated with flow ID "Flow-C". Data 754 and 757 are forwarded via egress port 5 on link 733, with data 754 associated with flow ID "Flow-D" and data 757 associated with flow ID "Flow-E". In one embodiment, by adding up the source PPU ID the system is giving some offset to a flow ID so that different source flows will start from a different linkage. However, the workload may not be well balanced.

Figure 8:
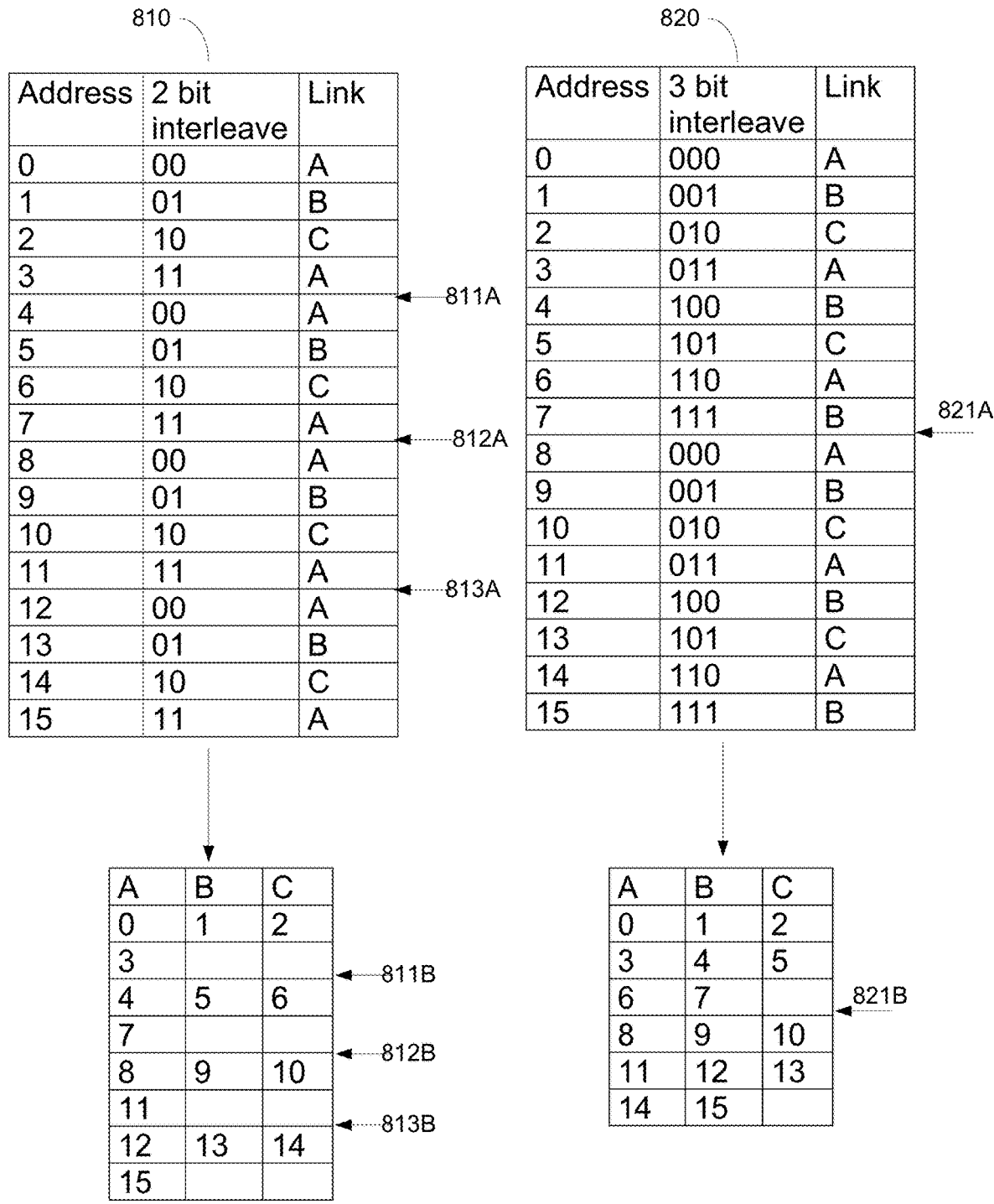
FIG. 8 illustrates an example of different workload balancing based upon different number of PA bit interleaving in accordance with one embodiment.

In one embodiment, using more PA bits for interleaving can improve workload distribution and balance. FIG. 8 illustrates an example of different workload balancing based upon different number of PA bit interleaving in accordance with one embodiment. The tables 810 and 820 illustrate the different workload distribution between 2 bit interleaving and 3 bit interleaving over three communication links (e.g., A, B, C, etc.). In one embodiment, the bits that are interleaved are the least significant bits of an address. The bottom

TABLE 2

| DestPPU_ID | Egress 0 | Egress 1 | Egress 2 | Egress 3 | Egress 4 | Egress 5 | Egress 6 |
|---|---|---|---|---|---|---|---|
| ... | | | | | | | |
| 706 | 0 | 0 | 1 | 1 | 0 | 1 | 0 |
| ... | | | | | | | |

The routing table indicates that egress ports 2, 3, and 5 are available to forward the information to PPU 706. After determining the ports that are available, PPU 705 then utilizes "smart" features to determine which egress port to send the data on headed to destination PPU 706.

In one embodiment, there is a unique flow ID that includes the destination information ID (e.g., PPU 706, etc.). The flow ID is used to determine which of the available egress ports a communication packet is forwarded on. In one table show the same information but in a different table format that provides a more instinctive indication of the better workload balance of the three bit interleaving compared to the two bit interleaving. The interleaving pattern repetition in the table 810 are indicated by references 811A, 812A, and 813A in the top table and corresponding 811B, 812B, and 813B in the bottom table. The interleaving pattern repetition in the table 820 is indicated by references 811A in the top table and corresponding 821B in the bottom table.

In one embodiment, routing schemes utilize routing tables and destination physical address interleaving. A routing scheme at a source PPU can include a flow ID is assigned based upon interleaving a physical address into a minimum link number indication (e.g., PA-inter into MinLink=>flowid, etc.). A routing scheme at a relay PPU can include an interleaving with flow ID and source ID (e.g., interleaving with flowid=srcid, etc.).

In one embodiment, a PPU includes a routing table that is shared by two different modules of the PPU ICN subsystem (e.g., 230, etc.). In one exemplary implementation, when a PPU is acting as a source PPU, an ICN subsystem communication control block (e.g., 232, etc.) utilizes the routing table to forward a message. In one exemplary implementation, when a PPU is acting as relay PPU, an ICN subsystem switch (e.g., 234 etc.) utilizes the routing table to forward a message. In one exemplary implementation, an ICN subsystem communication control block (e.g., 232, etc.) implements a first algorithm that utilizes the routing table to forward a message. In one exemplary implementation, when a PPU is acting as relay PPU, an ICN subsystem switch (e.g., 234 etc.) implements a second algorithm that utilizes the routing table to forward a message. The first and second algorithm can be different. The first algorithm can include:

ePort_id=mapping (Flow_id % #MinLink)

and the second algorithm can include:

ePort=mapping[(src_PPU_ID+flow_ID) % num_possible_ePort].

In one exemplary implementation, when a PPU is acting as a relay PPU, an indication of an egress port selection for the relay can be expressed as the second algorithm.

FIG. 9 is a flow chart of an exemplary communication method 900 in accordance with one embodiment.

In block 910, a setup operation is performed, including creation routing tables. The routing tables can include a static pre-determined routing table. In one exemplary implementation, at setup time a driver walks through the topology gathering information to include in the routing tables. The routing tables can include an indication of the number of minimum links in the path to the destination PPU. In one embodiment, the some of the routing links are disabled so that each destination PPU entry in the table has a number of available egress ports equal to the number of minimum links in a communication path (e.g., #ePort=#MinLink, etc.).

In block 920, a communication packet is forwarded from a source parallel processing unit (PPU). In one embodiment, the communication packet is formed and forwarded in accordance with the static pre-determined routing tables.

In one embodiment, a communication packet is forwarded based upon a routing scheme. In one exemplary implementation, a routing scheme at the source PPU is determined by: creating a flow ID associated with a unique communication path through the interconnects, wherein the flow ID is established by hashing a selected number of bits in the physical address; utilizing a corresponding one of the routing tables to ascertain a minimum links path to a destination; and establishing a routing selection based upon the flow ID and the minimum links path. In one exemplary implementation, a routing scheme at the relay PPU includes selecting an egress port, wherein selection of the egress port includes: creating a flow ID associated with a unique communication path through the interconnects, wherein the flow ID is established by hashing a selected number of bits in the physical address; mapping a source PPU ID and the flow ID; determining the number of possible egress ports available based upon the mapping; utilizing a corresponding one of the routing tables to ascertain a minimum links path to a destination; and establishing a routing selection based upon the flow ID, the number of possible egress ports, and the minimum links path.

In block 930, the communication packet is received at a destination parallel processing unit (PPU). In one embodiment, the source PPU and destination PPU are included in respective ones of a plurality of processing units included in a network, wherein a first set of the plurality processing cores are included in a first chip and a second set of the plurality processing cores are included in a second chip, and wherein the plurality of processing units communicates over a plurality of interconnects and corresponding communications are configured in accordance with the static pre-determined routing tables.

In one embodiment, exemplary communication method 900 further comprises balancing the forwarding of the communication packet, including distributing the communication packet via physical address based interleaving.

In one embodiment a processing system, comprises: a plurality of processing cores, wherein a first set of the plurality processing cores are included in a first chip; a plurality of memories, wherein a first set of the plurality of memories are included in the first chip and coupled to the first set of the plurality of processing cores; and a plurality of interconnects configured to communicatively couple the plurality of processing cores. The plurality of interconnects can be included in an inter-chip network (ICN). The plurality of interconnects can include the first set of the plurality of processing cores wherein the plurality of processing units communicates over the plurality of interconnects and corresponding communications are configured in accordance with routing tables. The routing tables can be static and predetermined. The routing tables can include indications of minimum links between a source and a destination. The routing tables can be loaded in registers associated with the plurality of processing units as part of a setup of the plurality of processors before running normal processing operations. The routing tables can be re-configurable. In one exemplary implementation, the routing tables are compatible with a basic X-Y routing scheme. In one exemplary implementation, schematically the PPUs are organized in a two-dimensional array in which Y corresponds to one dimension in the two-dimensional array and X corresponds to the other dimension in the two-dimensional array and the routing scheme restricts routing direction turns from the Y dimension to the X dimension. The Y dimension can correspond to a "column" dimension of the two-dimensional array and the X dimension can correspond to a "row" dimension of the two-dimensional array.

In one embodiment, respective ones of the plurality of processors includes respective ones of a plurality of parallel processing units (PPUs). In one exemplary implementation, the respective ones of the plurality of parallel processing units include respective ones of the routing tables. In one embodiment, a respective one of a plurality of parallel processing units is considered a source PPU when a communication originates at the respective one of a plurality of parallel processing units, a relay PPU when a communication passed through the respective one of a plurality of parallel processing units, or a destination PPU when a communication ends at the respective one of a plurality of parallel processing units. Respective ones of the plurality of interconnects can be configured for single-flow balancing, wherein the source PPU supports parallel communication flows up to a narrowest number of links between the source PPU and the destination PPU. Respective ones of the plurality of interconnects can be configured for many-flow balancing, wherein a relay PPU runs routing to balance flows among egresses. Communications can be processed in accordance with a routing scheme that provides balanced workloads, guaranteed dependency, and guaranteed access orders.

In one embodiment, a communication method includes: performing a setup operation including creation of static pre-determined routing tables; forwarding a communication packet from a source parallel processing unit (PPU), wherein the communication packet is formed and forwarded in accordance with the static pre-determined routing tables; and receiving the communication packet at a destination parallel processing unit (PPU). In one embodiment, the source PPU and destination PPU are included in respective ones of a plurality of processing units included in a network, wherein a first set of the plurality processing cores are included in a first chip and a second set of the plurality processing cores are included in a second chip, and wherein the plurality of processing units communicates over a plurality of interconnects and corresponding communications are configured in accordance with the static pre-determined routing tables.

In one embodiment, a communication packet is forwarded based upon a routing scheme. In one exemplary implementation, a routing scheme at the source PPU is determined by: creating a flow ID associated with a unique communication path through the interconnects, wherein the flow ID is established by hashing a selected number of bits in the physical address; utilizing a corresponding one of the routing tables to ascertain a minimum links path to a destination; and establishing a routing selection based upon the flow ID and the minimum links path. In one exemplary implementation, a routing scheme at the relay PPU includes selecting an egress port, wherein selection of the egress port includes: creating a flow ID associated with a unique communication path through the interconnects, wherein the flow ID is established by hashing a selected number of bits in the physical address; mapping a source PPU ID and the flow ID; determining the number of possible egress ports available based upon the mapping; utilizing a corresponding one of the routing tables to ascertain a minimum links path to a destination; and establishing a routing selection based upon the flow ID, the number of possible egress ports, and the minimum links path. In one embodiment, the communication method further comprises balancing the forwarding of the communication packet, including distributing the communication packet via physical address based interleaving.

In one embodiment, a processing system comprises: a plurality of processing cores, a plurality of memories, a plurality of interconnects configured to communicatively couple the plurality of processing cores and the plurality of memories. The plurality of processing cores includes a first set of the plurality processing cores that are included in a first chip and a second set of the plurality processing cores are included in a second chip. The plurality of memories include a first set of the plurality of memories that are included in the first chip and coupled to the first set of the plurality of processing cores and a second set of the plurality of memories are included in the second chip and coupled to the second set of the plurality of processing cores. The plurality of interconnects can be included in an inter-chip network (ICN). The plurality of interconnects can be configured to communicatively couple the first set of the plurality of processing cores and second set of the plurality of processing cores wherein the plurality of processing cores communicates over the plurality of interconnects.

Corresponding communications can be configured in accordance with routing tables. The routing tables can be static and predetermined. The routing tables can be loaded in registers associated with the plurality of processing units as part of a setup of the plurality of processors before running normal processing operations. The routing tables can include indications of minimum links between a source and a destination. In one embodiment, balanced workloads are provided by multi-flow through minimal links and interleaving with flow ID and source parallel processing unit (PPU) ID. In one exemplary implementation, guaranteed dependency is provided by utilization of physical address (PA) interleaving with flow ID and hashing at the source parallel processing unit (PPU). Guaranteed access orders can be provided by utilization of flow ID along routs and splittable remote-fence.

In summary, embodiments according to the present disclosure provide an improvement in the functioning of computing systems in general and applications such as, for example, neural networks and AI workloads that execute on such computing systems. More specifically, embodiments according to the present disclosure introduce methods, programming models, and systems that increase the speed at which applications such as neural network and AI workloads can be operated, by increasing the speeds at which memory access requests (e.g., read requests and write requests) between elements of the system are transmitted and resultant data transfers are completed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of configurations. In addition, any disclosure of components contained within other components should be considered as examples because many other architectures can be implemented to achieve the same functionality.

In one embodiment, a system comprises a parallel processing unit (PPU) included in a first chip and the PPU is one of a plurality of PPUs and a plurality of interconnects in an inter-chip network (ICN) configured to communicatively couple the plurality of PPUs. The PPU can include a plurality of processing cores and a plurality of memories, wherein a first set of the plurality of memories are included in the first chip and coupled to the first set of the plurality of processing cores. The PPU can be one of a plurality of PPUs that communicate with one another over the ICN and corresponding communications are configured in accordance with routing tables. The routing tables can be stored and reside in registers of an ICN subsystem included in the PPU. The routing tables can include indications of minimum links available to forward a communication from the PPU and another PPU.

In one embodiment, a system comprises: a plurality of PPUs included in a first chip and a plurality of interconnects in an ICN. The plurality of PPUs are included in a first chip and each of the PPUs includes a plurality of processing cores and a plurality of memories, wherein a first set of the memories couple to a first set of the plurality of processing cores. The plurality of interconnects in the ICN are configured to communicatively couple the plurality of PPUs. Each of the PPUs are configured to communicate over the ICN in accordance with respective routing tables that are stored and reside in registers included in the respective PPUs. The respective routing tables include indications of minimum links available to forward a communication from the PPU to another PPU. The PPUs can include respective plurality of egress ports configured to communicatively couple to the ICN, wherein the respective routing tables include indications of a correlation between the minimum links and the respective plurality of egress ports.

In one embodiment, respective ones of the routing tables include indications of a correlation between the minimum links and respective ones of a plurality of egress ports that are available for communication coupling to the respective ones of PPUs that are possible destination PPUs. The routing tables can include indications of a single path between two PPUs per respective information communication flow, wherein the signal path is based upon the correlation between the minimum links and respective ones of a plurality of egress ports that are available for communication coupling to the respective ones of PPUs that are possible destination PPUs. The routing tables cam be loaded and stored in registers of an ICN subsystem included in the PPU. The routing tables can be loaded as part of configuration and setup operations of the communication capabilities of the ICN and the plurality of PPUs before running normal processing operations. In one embodiment, the routing tables are: static and predetermined in between execution of the configuration and setup operations of the communication capabilities of the ICN and the plurality of PPUs; and re-configurable as part of ICN configuration and setup operations of the communication capabilities of the ICN and the plurality of PPUs, wherein the setup operations include loading and storing the routing tables in registers of an ICN subsystem included in the PPU. In one exemplary implementation, the routing tables are compatible with a basic dimension ordered X-Y routing scheme, in which schematically the PPUs are organized in a two-dimensional array in which Y corresponds to one dimension in the two-dimensional array and X corresponds to the other dimension in the two-dimensional array and the routing scheme restricts routing direction turns from the Y dimension to the X dimension.

In one embodiment, the PPU is included in a first set of the plurality of PPUs and the first set of the plurality of PPUs is included in a first compute node, and a second set of the plurality of PPUs is included in a second node of the plurality of PPUs. Respective ones of the plurality of parallel processing units can include respective ones of the routing tables. A respective one of a plurality of parallel processing units can be considered a source PPU when a communication originates at the respective one of a plurality of parallel processing units, a relay PPU when a communication passes through the respective one of a plurality of parallel processing units, or a destination PPU when a communication ends at the respective one of a plurality of parallel processing units. Respective ones of the plurality of interconnects can be configured for single-flow balancing, wherein the source PPU supports parallel communication flows up to a narrowest number of links between the source PPU and the destination PPU. Respective ones of the plurality of interconnects can be configured for many-flow balancing, wherein a relay PPU runs routing to balance flows among egresses. Communications can be processed in accordance with a routing scheme that provides balanced workloads, guaranteed dependency, and guaranteed access orders.

In one embodiment a communication method comprises performing a setup operation including creation of static pre-determined routing tables, forwarding a communication packet from a source parallel processing unit (PPU), and receiving the communication packet at a destination parallel processing unit (PPU). The communication packet can be formed and forwarded in accordance with the static pre-determined routing tables. The source PPU and destination PPU can be included in respective ones of a plurality of processing units included in a network. In one exemplary implementation, a first set of the plurality processing cores are included in a first chip and a second set of the plurality processing cores are included in a second chip. The plurality of PPUs can communicate over a plurality of interconnects. Corresponding communications can be configured in accordance with the static pre-determined routing tables. A routing scheme at the source PPU can be determined by: creating a flow ID associated with a unique communication path through the interconnects, wherein the flow ID is established by hashing a selected number of bits in the physical address; utilizing a corresponding one of the routing tables to ascertain a minimum links path to a destination; and establishing a routing selection based upon the flow ID and the minimum links path. A routing scheme at the relay PPU can including selecting an egress port. Selection of the egress port can include: creating a flow ID associated with a unique communication path through the interconnects, wherein the flow ID is established by hashing a selected number of bits in the physical address; mapping a source PPU ID and the flow ID; determining the number of possible egress ports available based upon the mapping; utilizing a corresponding one of the routing tables to ascertain a minimum links path to a destination; and establishing a routing selection based upon the flow ID, the number of possible egress ports, and the minimum links path. The communication method can further comprise balancing the forwarding of the communication packet, including distributing the communication packet via physical address based interleaving.

In one embodiment a system comprises: a first set of parallel processing units (PPUs) included in a first compute node, a second set of parallel processing units (PPUs) included in a second compute node and a plurality of interconnects in an inter-chip network (ICN) configured to communicatively couple the first set of PPUs and the second set of PPUs. The respective PPUs included in the first set of PPUs can be included in separate respective chips, and the respective PPUs included in the second set of PPUs can be included in separate respective chips. The PPUs included in the first set of PPUs and the second set of PPUs can communicate over the plurality of interconnects. The corresponding communications are configured in accordance with routing tables that reside in storage features of respective ones of the PPUs included in the first set of PPUs and the second set of PPUs. Respective ones of the PPUs included in the first set of PPUs and the second set of PPUs can comprise: a plurality of processing cores, wherein respective sets of processing cores are included in respective ones of the PPUs; and a plurality of memories, wherein respective sets of memories are communicatively coupled to the respective sets of sets of processing cores and included in the respective ones of the PPUs.

In one embodiment, the plurality of processing units can communicate over the plurality of interconnects and corresponding communications are configured in accordance with routing tables. The routing tables can be static and predetermined. The routing tables can be loaded in registers associated with the plurality of processing units as part of a setup of the plurality of processors before running normal processing operations. In one exemplary implementation, the routing tables include indications of minimum links between a source and a destination. Balanced workloads can be provided by multi-flow through minimal links and interleaving with flow ID and source parallel processing unit (PPU) ID. Guaranteed dependency can be provided by utilization of physical address (PA) interleaving with flow ID and hashing at the source parallel processing unit (PPU). Guaranteed access orders can be provided by utilization of flow ID along routs and splitable remote-fence.

Although the subject matter has been described in language specific to structural features and/or methodological acts, it is to be understood that the subject matter defined in this disclosure is not necessarily limited to the specific features or acts described above. Rather, the specific features and acts described above are disclosed as example forms of implementing this disclosure.

Embodiments according to the invention are thus described. While the present invention has been described in particular embodiments, the invention should not be construed as limited by such embodiments, but rather construed according to the following claims.

The invention claimed is:

1. A system comprising:
a plurality of parallel processing units (PPUs) included in a first chip, each of the PPUs includes:
  a plurality of processing cores;
  a plurality of memories, wherein a first set of the memories couple to a first set of the plurality of processing cores; and
  a plurality of interconnects in an inter-chip network (ICN) configured to communicatively couple the plurality of PPUs,
wherein each of the PPUs is configured to communicate over the ICN in accordance with respective routing tables that are stored and reside in registers included in the respective PPUs, and wherein the respective routing tables include indications of minimum links available to forward a communication from the PPU to another PPU.

2. The system of claim 1, wherein the PPUs include respective plurality of egress ports configured to communicatively couple to the ICN, wherein the respective routing tables include indications of a correlation between the minimum links and the respective plurality of egress ports.

3. The system of claim 1, wherein the respective routing tables include indications of a single path between two PPUs per respective information communication flow, wherein the single path is based upon the correlation between the minimum links and respective ones of a plurality of egress ports that are available for communication coupling to the respective ones of PPUs that are possible destination PPUs.

4. The system of claim 1, wherein the respective routing tables are loaded and stored in registers of an ICN subsystem included in the PPUs, wherein the respective routing tables are loaded as part of configuration and setup operations of the communication capabilities of the ICN and the plurality of PPUs before running normal processing operations.

5. The system of claim 1, wherein the respective routing tables are:
static and predetermined in between execution of the configuration and setup operations of the communication capabilities of the ICN and the plurality of PPUs; and
re-configurable as part of ICN configuration and setup operations of the communication capabilities of the ICN and the plurality of PPUs, wherein the setup operations include loading and storing the respective routing tables in registers of an ICN subsystem included in the PPU.

6. The system of claim 5, wherein the respective ones of the plurality of parallel processing units include respective ones of the routing tables.

7. The system of claim 5, a respective one of a plurality of parallel processing units is considered a source PPU when a communication originates at the respective one of a plurality of parallel processing units, a relay PPU when a communication passes through the respective one of a plurality of parallel processing units, or a destination PPU when a communication ends at the respective one of a plurality of parallel processing units.

8. The system of claim 7, wherein respective ones of the plurality of interconnects are configured for single-flow balancing, wherein the source PPU supports parallel communication flows up to a narrowest number of links between the source PPU and the destination PPU.

9. The system of claim 1, wherein the respective routing tables are compatible with a basic dimension ordered X-Y routing scheme, in which schematically the PPUs are organized in a two-dimensional array in which Y corresponds to one dimension in the two-dimensional array and X corresponds to the other dimension in the two-dimensional array and the routing scheme restricts routing direction turns from the Y dimension to the X dimension.

10. The system of claim 1, wherein the PPU is included in a first set of the plurality of PPUs and the first set of the plurality of PPUs is included in a first compute node, and a second set of the plurality of PPUs is included in a second node of the plurality of PPUs.

11. The system of claim 10, wherein respective ones of the plurality of interconnects are configured for many-flow balancing, wherein a relay PPU runs routing to balance flows among egresses.

12. The system of claim 1, wherein communications are processed in accordance with a routing scheme that provides balanced workloads, guaranteed dependency, and guaranteed access orders.

13. A communication method comprising:
performing a setup operation including creation of static pre-determined routing tables;
forwarding a communication packet from a source parallel processing unit (PPU), wherein the communication packet is formed and forwarded in accordance with the static pre-determined routing tables;
receiving the communication packet at a destination parallel processing unit (PPU); and
wherein the source PPU and destination PPU are included in respective ones of a plurality of parallel processing units (PPUs) included in a network,
wherein a first set of the plurality processing cores are included in a first chip and a second set of the plurality processing cores are included in a second chip, and wherein the plurality of processing units communicate over a plurality of interconnects and corresponding communications are configured in accordance with the static pre-determined routing tables
wherein a routing scheme at the source PPU is determined by:
creating a flow ID associated with a unique communication path through the interconnects;
utilizing a corresponding one of the routing tables to ascertain a minimum number of links path to a destination; and
establishing a routing selection based upon the flow ID and the minimum number of links path.

14. The communication method of claim 13, wherein the flow ID is established by hashing a selected number of bits in a physical address.

15. The communication method of claim 13, wherein a routing scheme at the relay PPU includes selecting an egress port, wherein selection of the egress port includes:
- creating a flow ID associated with a unique communication path through the interconnects, wherein the flow ID is established by hashing a selected number of bits in a physical address;
- mapping a source PPU ID and the flow ID;
- determining the number of possible egress ports available based upon the mapping;
- utilizing a corresponding one of the routing tables to ascertain a minimum links path to a destination; and
- establishing a routing selection based upon the flow ID, the number of possible egress ports, and the minimum links path.

16. The communication method of claim 13, further comprising balancing the forwarding of the communication packet, including distributing the communication packet via physical address based interleaving.

17. A system, comprising:
- a first set of parallel processing units (PPUs) included in a first compute node, wherein respective PPUs included in the first set of PPUs are included in separate respective chips;
- a second set of parallel processing units (PPUs) included in a second compute node, wherein respective PPUs included in the second set of PPUs are included in separate respective chips; and
- a plurality of interconnects in an inter-chip network (ICN) configured to communicatively couple the first set of PPUs and the second set of PPUs,
wherein PPUs included in the first set of PPUs and the second set of PPUs communicate over the plurality of interconnects and corresponding communications are configured in accordance with routing tables that reside in storage features of respective ones of the PPUs included in the first set of PPUs and the second set of PPUs, and wherein the routing tables include indications of minimum links available to forward communications between a source and destination included in the respective ones of the PPUs.

18. The system of claim 17 wherein respective ones of the PPUs included in the first set of PPUs and the second set of PPUs comprises:
- a plurality of processing cores, wherein respective sets of processing cores are included in respective ones of the PPUs; and
- a plurality of memories, wherein respective sets of memories are communicatively coupled to the respective sets of sets of processing cores and included in the respective ones of the PPUs.

19. The system of claim 17, wherein the plurality of processing units communicates over the plurality of interconnects and corresponding communications are configured in accordance with routing tables, wherein the routing tables are static and predetermined, wherein the routing tables are loaded in registers associated with the plurality of processing units as part of a setup of the plurality of processors before running normal processing operations.

20. The system of claim 17 wherein balanced workloads are provided by multi-flow through minimal links and interleaving with flow ID and source parallel processing unit (PPU) ID.

21. The system of claim 17 wherein guaranteed dependency is provided by utilization of physical address (PA) interleaving with flow ID and hashing at the source parallel processing unit (PPU).

22. The system of claim 17 wherein guaranteed access orders are provided by utilization of flow ID along routs and splittable remote-fence.

* * * * *